E. RICARD.
MANUFACTURE OF FURFUROL.
APPLICATION FILED NOV. 22, 1917.
1,322,054.
Patented Nov. 18, 1919.
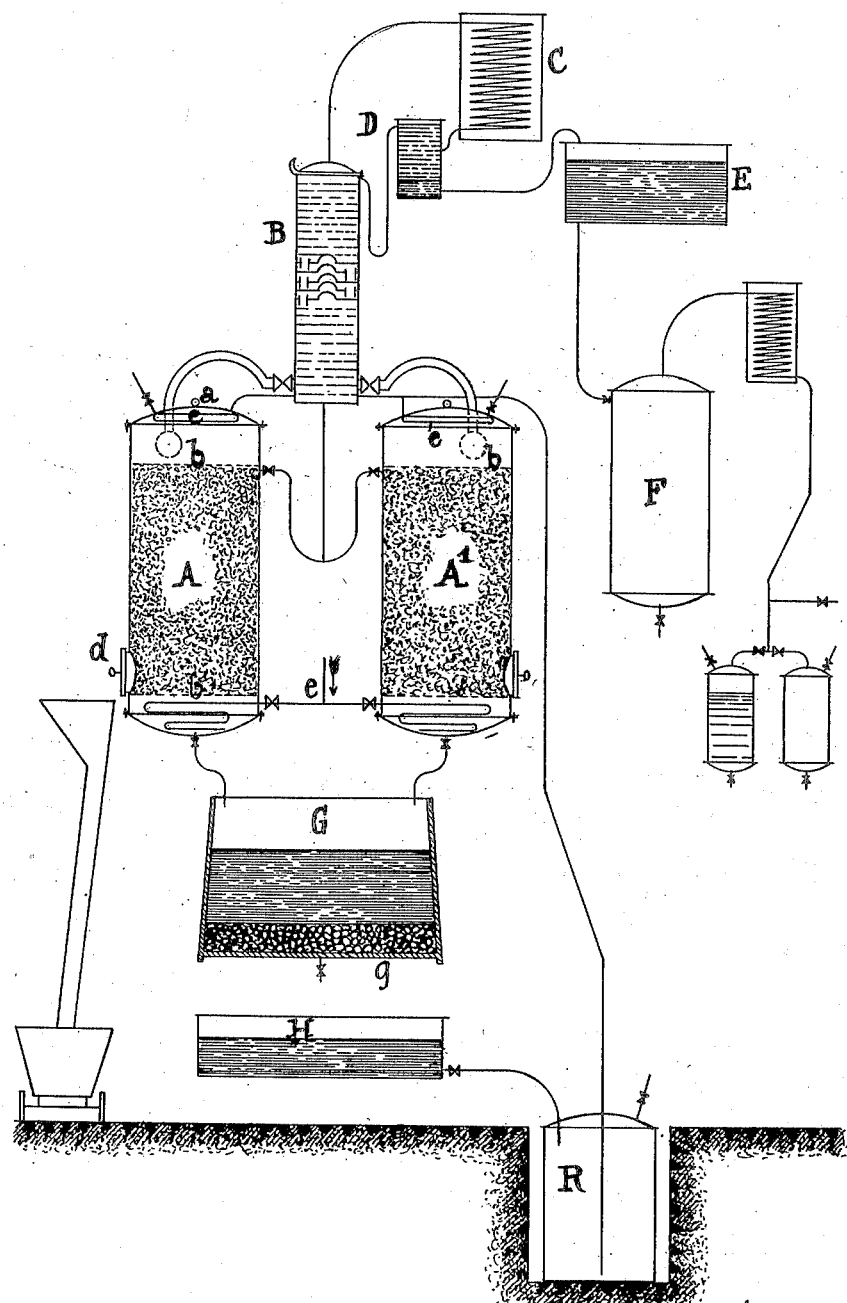
INVENTOR:
Eloi Ricard
By his Attorneys
Fraser, Junk & Myers

UNITED STATES PATENT OFFICE.

ELOI RICARD, OF MELLE, FRANCE.

MANUFACTURE OF FURFUROL.

1,322,054. Specification of Letters Patent. Patented Nov. 18, 1919.

Application filed November 22, 1917. Serial No. 203,439.

*To all whom it may concern:*

Be it known that I, ELOI RICARD, a citizen of the Republic of France, residing in Melle, Deux-Sèvres, France, have invented certain new and useful Improvements in the Manufacture of Furfurol, of which the following is a specification.

Furfurol is produced by the action of acids, such as sulfuric acid, hydrochloric acid or formic acid, or of certain chlorids, such as calcium chlorid or zinc chlorid, on cellulosic materials and various carbohydrates.

The material is immersed in the reagent slightly diluted with water and the liquid is heated to boiling and is afterward distilled.

The yield obtained and the purity of the furfurol vary with the nature of the parent material, the nature of the reagent used, the degree of dilution of the latter and the duration of the heating. With this mode of manufacture injurious secondary reactions always accompany the principal action; some of these produce bodies which render the furfurol impure while others destroy some of the furfurol before it leaves the mass.

The present invention relates to an improved process whereby the yield is greater than hitherto and the product is of high purity and keeps well. The invention also includes a plant for the manufacture.

The improvements reside in:—

1. The use of reagents diluted as far as possible.

2. In extracting the furfurol from the mass in which it has been produced as soon as it is formed.

3. In rapidly withdrawing the furfurol from contact with the aqueous and acid medium with which it distils.

4. In dehydrating and decolorizing the furfurol by rectification in a vacuum.

The accompanying diagram shows by way of example an apparatus in which the improved manufacture may be conducted.

The reaction occurs in boilers A, A', operated alternately. One pair of boilers is shown but there may be several such pairs. They are heated by suitable means, such as by heating worms, double bottoms or heating jackets, the means employed being adapted to produce rapid distillation. From these boilers the vapors rise through a washing and fractionating column B containing bubbling plates and constructed like the rectifying column of an alcohol still. From this column they enter the condenser C; the condensed liquid flows into the gravity separator D. From this the hydrated furfurol flows to the reservoir E whence it is fed into a vacuum still F provided with the usual accessories.

The water which constitutes the upper layer in the separator D flows into the upper part of the column B and down the latter into the boiler A; it flows through this into a vat G whence it is drawn through a filter into a vat H to be ultimately collected in the elevator R. In this manner the condensed water washes the acid or like agent from the boiler for re-use.

As an example the operation will now be described as applied to a cellulosic material, kapok.

The cover $a$ is removed and the boiler A charged with 500 kilos of kapok of poor quality. Kapok is light and difficult to moisten, properties which it shares but in larger degree with most cellulosic materials. To prevent the mass from floating, it is held in the boiler between two perforated plates $b$. By means of the elevator R diluted hydrochloric acid containing 13–14 per cent. of HCl is run into the boiler until the upper plate $b$ has been covered.

The boiler is then heated so as to obtain rapid distillation by introducing steam at $e$. The vapors produced pass up the column B bubbling from plate to plate and eventually enter the condenser C. The condensate flows into the separator D, the furfurol constituting a lower layer which passes into the reservoir E. The water which is condensed together with the furfurol and retains a part of the latter in solution forms the upper layer in the separator D and flows down the column B descending from plate to plate, and giving up its furfurol, until it finally enters the boiler A. There is thus a methodical washing of the vapors ascending the column, whereby the hydrochloric acid, impurities and froth (which froth is very important when sulfuric acid is used) are returned to the boiler A. The operation is finished when no more furfurol can be found to leave the separator D. This generally happens in about 2–3 hours. The yield may be 75 kilos of furfurol, that is to say about 15 per cent. of the weight of the kapok.

The heating is so conducted that the total quantity of washing liquid which descends column B to return to boiler A may be at least equal to one and a half times the volume of the liquid contained in the boiler; in other words, the contents of the boiler are distilled at least one and a half times. The high degree of dilution of the reagent avoids violent action in the boiler and the rapidity of the distillation removes instantly the furfurol which forms moderately slowly. These two features of the process determine the high yield.

Moreover, the washing and fractionation in the column B insures a high purity of the furfurol which collects in the separator D.

These particular conditions do not obtain in other processes of manufacture.

When the reaction is finished the liquid is emptied from boiler A into the vat G and carries with it the debris of the cellulosic material, which makes it turbid. The contents of the boiler are washed by sprinkling with water from a worm $c$ the spent kapok which retains hydrochloric acid and in this manner the greater part of the latter is recovered and collected in the vat G. The bottom of this vat is covered to a depth of some centimeters with a layer of inert valueless material $g$, for instance subdivided slag.

The acid filters through this layer depositing the debris of the cellulose and passes in clear condition into the receiver H whence it may be withdrawn to serve indefinitely. The spent kapok is withdrawn from the boiler A through a manhole $d$ and removed in any suitable manner. The boiler A is recharged while boiler A' is being heated and vice versa, so that there is a continuous manufacture.

The operation is similar whatever the material or reagent used. The quantity of reagent used is very small since it is only necessary to make up the losses due to the small quantity which remains in the spent material after it has been washed.

In any case the furfurol collected in E is free from impurities except that it is hydrated and slightly colored. It is dehydrated either by distillation which easily eliminates the water first, or by action of cold which precipitates the water owing to its great insolubility at low temperature. The decolorization by distillation may then follow.

It has been found of very great advantage to conduct this operation at a low temperature, in fact under ordinary conditions it is necessary to distil at a temperature of 162° C. and it has been found that for some time after such treatment the furfurol has a tendency to become colored when exposed to air and light and then to blacken. By distilling in a vacuum at a relatively low temperature furfurol of better keeping quality is obtained (the keeping quality is generally favored by the condition of purity of the product) and at the same time the dissolved water is very easily eliminated.

For this distillation the furfurol may be run from the reservoir E into a vacuum still F. The water begins to pass over at about 65° C. carrying with it a little dissolved furfurol and then the temperature rises suddenly to 90-92° C. when all the water has been removed. The furfurol now distils over anhydrous and almost colorless; it is completely stable.

Having thus described the nature of my said invention and the best means I know for carrying the same into practical effect, I claim:—

1. A process of manufacturing furfurol, comprising treating a cellulosic material with dilute acid, and rapidly distilling off the furfurol during the formation of the furfurol by the action of the dilute acid on the cellulosic material.

2. A process of manufacturing furfurol, comprising treating a cellulosic material with dilute acid, rapidly distilling off the furfurol during the formation of the furfurol by the action of the dilute acid on the cellulosic material, and fractioning the vapors passing over in the distillation into a furfurol vapor passing over, and an acid liquid passing back to the cellulosic material undergoing treatment.

3. A process of manufacturing furfurol, comprising treating a cellulosic material with dilute acid, rapidly distilling off the furfurol during the formation of the furfurol by the action of the dilute acid on the cellulosic material, and washing the spent cellulosic material to recover the acid liquid contained therein.

4. A process of manufacturing furfurol, comprising treating a cellulosic material with dilute acid, rapidly distilling off the furfurol during the formation of the furfurol by the action of the dilute acid on the cellulosic material, fractioning the vapors passing over in the distillation into a furfurol vapor passing over, an acid liquid passing back to the cellulosic material undergoing treatment, and distilling the furfurol obtained in a vacuum at a low temperature.

In witness whereof, I have hereunto signed my name in the presence of two subscribing witnesses.

ELOI RICARD.

Witnesses:
  CHAS. P. PRESSLY,
  HENRI CARTIER.